United States Patent
Yates

[15] 3,650,783
[45] Mar. 21, 1972

[54] TRIVALENT METAL PHOSPHATE COATED COLLOIDAL SILICA MOLDING POWDERS

[72] Inventor: Paul C. Yates, Wilmington, Del.
[73] Assignee: E. I. du Pont de Nemours and Company, Wilmington, Del.
[22] Filed: May 13, 1969
[21] Appl. No.: 824,266

[52] U.S. Cl. ............................106/69, 106/288 B, 106/302, 106/304, 106/308 B
[51] Int. Cl. .................................................C04b 35/14
[58] Field of Search ............106/69, 288 B, 302, 304, 308 B; 252/313 S

[56] References Cited

UNITED STATES PATENTS

| 2,649,388 | 8/1953 | Wills et al. | 106/69 |
| 2,995,453 | 8/1961 | Noble et al. | 106/69 |

Primary Examiner—James E. Poer
Attorney—John R. Powell

[57] ABSTRACT

Compositions having small particle sizes and containing (1) silica and (2) a trivalent metal phosphate and wherein the trivalent metal phosphate is distributed uniformly and homogeneously with respect to the silica, are useful as high temperature refractory binders, coatings, and adhesives and can be pressed to molded articles.

16 Claims, No Drawings

TRIVALENT METAL PHOSPHATE COATED COLLOIDAL SILICA MOLDING POWDERS

DESCRIPTION OF THE INVENTION

SUMMARY

The present invention is directed to compositions of matter consisting essentially of particles having a size in the range of from 3 millimicrons to 250 millimicrons and containing:
(A) 10 to 90percent, by weight, of amorphous silica and
(B) 90 to 10percent, by weight, of a trivalent phosphate selected from the group consisting of (i) boron phosphate, (ii) aluminum phosphate, (iii) ferric phosphate, and (iv) chromic phosphate, with the proviso that the trivalent phosphate is distributed uniformly and homogeneously with respect to the silica. The compositions may be in the form of a sol or a dry powder. The dry powders may be formed into dense bodies having theoretical densities in excess of 95percent by conventional pressing and sintering techniques.

The compositions can be prepared by contacting a colloidal silica sol having from 5 to 30 percent, by weight, of $SiO_2$, simultaneously with both:
1. a soluble source of a trivalent metal cation selected from the group consisting of boron, aluminum, iron, and chromium and
2. a source of phosphate anion selected from the group consisting of a soluble ionic phosphate salt and phosphoric acid, the proportions of (1) and (2) being such that for each molar portion of trivalent metal ion there is added from 0.5 moles to 1.5 moles of phosphate anion.

SOURCES OF COLLOIDAL AMORPHOUS SILICA

The colloidal amorphous silica component used in the process for preparing the compositions of this invention can be obtained from a variety of sources including particles formed by the oxidation of silicon tetrachloride, such as commercially available 20 millimicron particles manufactured by the Cabot Corp. known as "Cab-O-Sil." Also useful are colloidal aqueous silica sols, including colloidal amorphous silica sols manufactured by E. I. du Pont de Nemours & Co., sold under the trade name of "Ludox" Colloidal Silica, in a number of grades. Exemplary of such silica sols are the following.
1. "Ludox" HS 40 which has a particle size of approximately 15 millimicrons, a $SiO_2$ concentration of 40% by weight, and a sodium oxide content of 0.4% by weight.
2. "Ludox" HS 30 which has a particle size of approximately 15 millimicrons, a $SiO_2$ concentration of 30% by weight, and a sodium oxide content of 0.3% by weight.
3. "Ludox" SM 15 which has a particle size of 7 millimicrons, a $SiO_2$ concentration of 15% by weight, and a sodium oxide content of 0.27% by weight.
4. "Ludox" SM 30 which has a particle size of 7 millimicrons, a $SiO_2$ concentration of 30% by weight, and a sodium oxide content of 0.54% by weight.
5. "Ludox" AS which has a particle size of approximately 15 millimicrons, a $SiO_2$ concentration of 30% by weight, and an ammonium hydroxide content of 0.43% by weight. This material has an extremely low sodium content.

Silica sols of a somewhat similar character are also available from a number of other sources, including National Aluminate Co. of America, Monsanto Chemical Co., and others.

Also suitable as starting materials for the compositions of this invention are precipitated, high surface area, amorphous silica particles such as colloidal 20 millimicron amorphous silica hydrated particles containing 93% $SiO_2$ and 7% water, available from the Huber Clay Co. sold under the trade name of "Zeosil" 100. Platelike and fibrous colloidal silica particles prepared by the acid leaching of minerals such as talc or fibrous minerals such as chrysolite asbestos are also suitable. Sols may also be prepared directly from aqueous ionic alkaline silicates by neutralization with acids by deionization with the hydrogen form of ion exchange resins, or by the hydrolysis of hydrolyzable silicon compounds, including silicon tetrachloride, ethyl orthosilicate, and others. It should be emphasized that when silica sols are prepared by one of the procedures described above, conditions must be controlled to give essentially discrete, nonaggregated, stable colloidal silica sols. Highly aggregated, three-dimensional precipitates while operable, are not effective starting materials for the compositions of this invention.

THE TRIVALENT METAL PHOSPHATE COMPONENTS

The trivalent metal phosphate is a material selected from the group consisting of boron phosphate, aluminum phosphate, ferric phosphate, and chromic phosphate. The preferred trivalent metal phosphate components are those in which the mole ratio of boron, aluminum, ferric or chromium cations to phosphate anions is about 1:1. Minor deviations from this ratio are permissible, and it is possible for example, to have from 0.5 to 1.5 phosphate anions per metal ion. However, it should be noted that as the number of phosphate groups per metal atom gets substantially greater than one, the solubility of such products in water increases rapidly, and the refractory character of the present compositions decreases. Similarly, at metal atom to phosphate ratios lower than one, there is a tendency for the metal atoms not to precipitate completely. If complete precipitation of the metal atom is ensured by increasing the pH, the product obtained is not a pure trivalent metal phosphate, but a mixture of the metal phosphate with the corresponding metal oxide. If quantities of metal oxide are too high, they harm the refractory properties of the compositions of the invention.

The trivalent phosphate is prepared in the presence of the silica by mixing in appropriate proportions (1) a soluble source of a trivalent metal cation and (2) a source of phosphate anion. Suitable sources of trivalent metal ions are aluminum nitrate, ferric nitrate, chromic nitrate, aluminum chloride, ferric chloride, chromic chloride, soluble forms of aluminum acetate, ferric acetate, chromic acetate, sodium borate, glycerol or sugar complexes of boric acid, and boric acid. Suitable sources of phosphate anions are phosphoric acid and soluble phosphate salts such as sodium phosphate, potassium phosphate, ammonium phosphate and their acid salts such as sodium dihydrogen phosphate and sodium monohydrogen phosphate.

It is necessary that the distribution of the trivalent metal phosphate with respect to the silica be very uniform and homogeneous. That is, the amorphous silica must be surrounded by the trivalent metal phosphate. It is also necessary that the particle size be within the colloidal range. It is not desirable to have very large particles of trivalent metal phosphate in the composition, and it is equally undesirable to have large particles (a micron or greater) of silica in the composition. A satisfactory distribution of the trivalent metal phosphate with respect to the colloidal silica is indicated when the trivalent metal phosphate concentration relative to the concentration of silica is independent of the silica content. By this it is meant that if the composition of the invention is centrifuged while in solution to create zones which are high in solids and others which are partly depleted, that the ratio of trivalent metal phosphate to silica is the same in both the solids enriched and depleted areas. If this is not the case it would be evidence of segregation of one constituent from the other and of a failure to obtain a homogeneous coating in which all of the phosphate was deposited on the colloidal silica particles.

RELATIVE PROPORTION OF THE ESSENTIAL INGREDIENTS

AT LEAST 10% by weight of the particles of the compositions of this invention should be the trivalent metal phosphate and at least 10% by weight should be the silica component. There is some mutual solubility of the trivalent metal phosphates in the silica component at sufficiently high temperatures, and conversely there is some solubility of the silica component in the trivalent metal phosphate at sufficiently high temperatures. Since one of the objectives sought for the compositions of this invention is a two-phase structure wherein each component minimizes the grain growth of the other, it is necessary to have a sufficient amount of each present so that the second phase does not completely disappear and the composition become a homogeneous solid solution of one component in the other. Since the solubility is of the order of a few percent of each phase in the other phase, solubility problems can be avoided by working within the compositional range of from 10% of one component to 10% of the other.

PROCESS CONDITIONS

Broadly, the process for making the composition of the invention comprises intimately and homogeneously coating the trivalent metal phosphate onto the surface of the colloidal amorphous silica in such fashion as to establish a stable chemical bond between the phosphate and the silica. This can be done by preparing a colloidal dispersion of silica and contacting this dispersion simultaneously with a solution containing a soluble source of the trivalent metal ion, that is, boron, aluminum, ferric or chromium atoms in their +3 states, while simultaneously and at equal rate delivering an equivalent number of moles of an ionic phosphate either as a soluble phosphate salt or as phosphoric acid.

For example, a silica sol having a concentration between 5% and 30% $SiO_2$ can be coated with the trivalent metal phosphates by slowly adding a soluble compound of the trivalent metal, such as boric acid or aluminum, ferric, or chromium nitrates, along with phosphoric acid at a rate which maintains a 1 to 1 mole ratio between the metal ion and the phosphate anion feeds. This process can be continued for as long a period of time as is required to build up the desired thickness of trivalent metal phosphate as a coating on the colloidal amorphous silica sols. Preferably, the operation is conducted at between 30° C. and 90° C. in order to facilitate the formation of a dense, uniform phosphate coating around the colloidal silica particles.

If it is desired to maintain the composition in the form of a stable, colloidal suspension, this can be done by deionizing the resulting phosphate solution either during its preparation or immediately thereafter, with the hydroxyl form of a strong base anion exchange resin, thereby removing the nitrate ions or other anions associated with the trivalent metal salt. Alternatively, although this does not give quite as stable an end product, the pH can be maintained by the addition of a base during the coating operation, such as the addition of ammonium hydroxide. The byproduct ammonium nitrate resulting from such an operation, for example, can be removed by a mixed ion exchange resin, by dialysis, or by other procedures conventionally employed to free solutions from soluble salts.

When it is desired to employ the compositions of the invention as a dry powder, the compositions can be freeze-dried or oven-dried and the powder recovered.

DENSE BODIES

Dense bodies having a density in excess of 95% of the theoretical density may be formed from the dry powder compositions of this invention by either cold pressing and sintering operations, or by hot pressing using techniques which are well known in the art. For example, the dry molding powder can be pressed under a pressure between 5,000 p.s.i. and 40,000 p.s.i. in a rigid steel mold into the desired shape and the molded product sintered to density over a period ranging from a few minutes to 24 hours at a temperature within the range of from 800° C. to about 1,200° C. If one is operating at the higher temperature, it is desirable to use relatively short sintering times so as to avoid grain growth or devitrification. If it is desired to prepare the finest grained solid materials, this can be done by extending the sintering time and lowering the sintering temperature.

Rather than fabricating by cold pressing and sintering, it is also possible to fabricate by hot pressing, in which case very short contact times are possible. When this procedure is used, the powder to be fabricated is loaded into a carbon, alumina, or other refractory mold and inserted in the hot zone of a furnace under a pressure of from 500 p.s.i. to 6,000 p.s.i. at a temperature of from 800° C. to 1,100° C. Using hot pressing, the contact times can be relatively short, ranging from approximately 30 seconds to 10 to 15 minutes. The dense solid body of the invention can then be ejected from the hot zone.

Theoretical density is computed by assuming that the molar volumes of the components are additive according to the equation:

$$\rho t = \sum_{i}^{i} v_i \rho_i$$

where
$\rho t$ = theoretical density in g./cc.,
$v_i$ = desired volume fraction of component $i$ per cc. of product, and
$\rho i$ = density in g./cc. of component $i$.

EXAMPLES

The following examples illustrate the preparation of the compositions of this invention. Parts are by weight unless otherwise indicated.

EXAMPLE 1

Four solutions prepared separately are simultaneously fed at a constant rate to a 5 liter flask containing a 500 ml. heel of water. Solution 1 is 1 liter of "Ludox" AS which contains 361.8 grams of $SiO_2$ and is fed at a rate of 6 liters per hour. Solution 2 is 1 liter of a 0.33 molar solution of aluminum nitrate which contains 124 grams of aluminum nitrate hydrate [$Al(NO_3)_3 \cdot 9H_2O$] and is fed at the rate of 6 liters per hour. Solution 3 is 1 liter of 0.33 molar phosphoric acid and is fed at the rate of 6 liters per hour. Solution 4 is 0.16 liters of dilute ammonium hydroxide prepared by diluting 28% ammonium hydroxide 1 to 1 with water. Solution 4 is added at the rate of 1 liter per hour. The mixing of the four solutions takes place over a period of 10 minutes and during this period the pH is maintained between 7 and 8.

The resulting aluminum phosphate coated $SiO_2$, which contains 10% aluminum phosphate and 90% $SiO_2$, is quickly frozen by pouring the solution into a pan immersed in a dry ice trichloroethylene mixture and is then freeze-dried in a high vacuum freeze drying apparatus. The resulting powder is used as a molding powder to prepare samples both by hot pressing and by cold pressing and sintering. One dense bar is prepared by hot pressing at 2,500 p.s.i. and 1,200° C. in about 2 minutes and this bar has a density of 99.3% of its theoretical density and has a transverse rupture strength of 9,000 p.s.i. A similar bar is cold pressed under 16,000 p.s.i. in a steel mold and is sintered for 17 hours at 1,100° C. Again this produces a somewhat opaque bar having a density of more than 98% of theoretical density, with no evidence of devitrification or porosity as determined by X-ray analysis and a measurement of its density.

EXAMPLE 2

One liter of "Ludox" AS containing 361.8 grams of $SiC_2$ is run into a 5 liter flask containing 500 ml. of distilled water simultaneously and at an equal rate with one liter of a 0.38 molar solution of boric acid, containing 23.5 grams of boric acid per liter, and one liter of 0.38 molar phosphoric acid, containing 37.3 grams of phosphoric acid on an anhydrous basis, along with sufficient 1 to 1 aqueous ammonium hydroxide to maintain the pH between 7 and 8 during the run. The resulting colloidal suspension of silica coated with 10% boron phosphate is freeze-dried as described in Example 1 and cold pressed by pressing at 13,000 p.s.i. and sintering for 17 hours at 1,200° C. Although there is a slight change in shape of the bar from a substantially square to a somewhat more cylindrical shape, the bar is clear, has a transverse rupture strength greater than 5,000 p.s.i. and a density of 98% of theoretical density, with no evidence of devitrification. A bar of the same material is hot pressed at a temperature of 1,200° C. and a pressure of 2,500 p.s.i. for a period of 3 minutes, and the resulting bars are clear and glassy, with no evidence of devitrification. The density is 2.18 g./cc., which is 100 % of theoretical and corresponds to the theoretical density to be expected of this composition. The transverse rupture strength of four such bars ranges from 6,700 to 7,350 p.s.i., which compares very favorably with the transverse rupture strength of fused amorphous silica glass. When placed next to an amorphous fused silica bar in a furnace heated at 1,200° C. until the fused silica devitrifies, the boron phosphate coated silica bar of this invention shows no evidence of devitrification.

EXAMPLE 3

One liter of "Ludox" AS containing 361.8 grams of $SiO_2$ is delivered simultaneously and at equal rates into a 500 ml. heel of water contained in a 5 liter flask along with (1) one liter of a solution of ferric nitrate, which is 0.267 molar in ferric ion, (2) 1 liter of a solution of 0.267 molar phosphoric acid containing 30.1 grams of 86.5% phosphoric acid per liter, and (3) sufficient dilute 1 to 1 ammonium hydroxide to maintain the pH in the range of 7 to 8. The resulting colloidal suspension contains colloidal particles consisting of 90% amorphous silica and a uniform dense coating on the surface of 10% of ferric phosphate.

EXAMPLE 4

361.8 grams of colloidal silica are coated using the same procedure as that of Example 3, with the exception that the coating solution in this instance consists of chromium nitrate and phosphoric acid and the amounts used are 20 times as great in terms of the amount of chromium nitrate and phosphoric acid solution. The resulting stable colloidal suspension consists of particles with a core of 10% by weight of colloidal amorphous silica and 90% by weight of chromium phosphate. This is centrifuged and washed three times by centrifugation and resuspended in a solution containing 3% free phosphoric acid. This forms a sticky, viscous, colloidal binding solution containing 20% by weight of the previously mentioned chromium phosphate coated colloidal amorphous silica particles, along with the free phosphoric acid. This composition is a good binder, adhesive and coating agent, and forms strong, durable refractory coatings when painted on steel surfaces, dried, and fired at temperatures above 800° C. It resists devitrification on prolonged exposure at temperatures as high as 1,000° C.

USES OF THE COMPOSITIONS OF THE INVENTION

The compositions of this invention are useful as refractory coatings, refractory adhesives, and in the form of dense solid bodies as high temperature structural materials. Compared with amorphous silica bodies of the prior art, the dense composites of this invention can be fabricated at lower temperatures and are more resistant to crystallization or devitrification than have been the silica bodies of the art. Similar advantages exist when comparing the compositions of this invention with those of the aluminum phosphate adhesives of the prior art, which similarly suffer from a tendency to devitrify and undergo excessive grain growth at high temperatures, thus lowering their mechanical strength.

The colloidal amorphous co-dispersions of the invention are useful as high temperature refractory binders and adhesives in any of a variety of uses to which high temperature binders are applied, such as the formation of precision investment casting molds for binding refractory grains, the bonding of refractory honeycomb structures, and a variety of similar uses. The molded dense bodies of the invention can be employed as structural materials for refractory purposes such as kiln furniture, and are particularly suitable as cores for insertion in casting molds to create intricately shaped holes in the casting, following solidification of the metal around the core and removal of the core material.

The compositions of this invention are also useful as refractory high temperature coatings, and can be applied either by brushing, painting, or spraying them onto either cold or hot surfaces, followed by heating to eliminate the moisture associated with the compositions of the invention. Thus they are useful as refractory inorganic paints, and can be employed, for example, to bond metallic zinc or aluminum particles strongly to the surfaces of steel articles. In this regard, they have a distinct advantage over colloidal amorphous silica particles which have hitherto been employed for this purpose, because the compositions of the present invention show improved adhesion to uncleaned and rusty steel surfaces, possibly as a result of the phosphate content.

What is claimed is:

1. A composition of matter consisting essentially of particles having a size in the range of from 3 millimicrons to 250 millimicrons and containing:
   A. 10 to 90%, by weight, of amorphous silica and
   B. 90 to 10%, by weight, of a trivalent phosphate selected from the group consisting of (i) boron phosphate, (ii) aluminum phosphate, (iii) ferric phosphate, and (iv) chromic phosphate, with the proviso that the trivalent phosphate is distributed uniformly and homogeneously with respect to the silica, forming a bonded coating thereon.

2. The composition of claim 1 wherein the particles are colloidally dispersed in water.

3. The composition of claim 1 wherein the particles are in the form of a dry powder.

4. The composition of claim 1 wherein the trivalent phosphate is boron phosphate.

5. The composition of claim 1 wherein the trivalent phosphate is aluminum phosphate.

6. The composition of claim 1 wherein the trivalent phosphate is ferric phosphate.

7. The composition of claim 1 wherein the trivalent phosphate is chromic phosphate.

8. A method for making a composition of matter consisting essentially of particles having a size in the range of from 3 millimicrons to 250 millimicrons and containing:
   A. 10 to 90%, by weight, of amorphous silica and
   B. 90 to 10%, by weight, of a trivalent phosphate selected from the group consisting of (i) boron phosphate, (ii) aluminum phosphate, (iii) ferric phosphate, and (iv) chromic phosphate, with the proviso that the trivalent phosphate is distributed uniformly and homogeneously with respect to the silica, forming a bonded coating thereon; said method comprising contacting a colloidal silica sol having from 5% to 30%, by weight, of $SiO_2$ simultaneously with both:
   1. a soluble source of a trivalent metal ion selected from the group consisting of boron, aluminum, iron, and chromium, and
   2. a source of phosphate anions selected from the group consisting of a soluble ionic salt and phosphoric acid the proportion of (1) and (2) being such that for each molar portion of trivalent metal ion there is added from 0.5 mole to 1.5 moles of phosphate ions.

9. The method of claim 8 wherein there is about one molar portion of phosphate anion for each molar portion of trivalent metal ion.

10. The process of claim 8 wherein the silica is contacted with (1) and (2) at a temperature within the range of 30° C. to 90° C.

11. The process of claim 8 wherein (1) is aluminum nitrate.

12. The process of claim 8 wherein (1) is boric acid.
13. The process of claim 8 wherein (1) is ferric nitrate.
14. The process of claim 8 wherein (1) is chromic nitrate.
15. The process of claim 8 wherein (2) is phosphoric acid.

16. A dense body containing 10 to 90%, by weight, of amorphous silica and 90 to 10%, by weight, of a trivalent phosphate selected from the group consisting of (i) boron phosphate, (ii) aluminum phosphate, (iii) ferric phosphate, and (iv) chromic phosphate, with the proviso that the trivalent phosphate is distributed uniformly and homogeneously with respect to the silica, forming a bonded coating thereon; said body having a density in excess of 95% of the theoretical density.

* * * * *